United States Patent
Tseng

(10) Patent No.: US 7,295,182 B2
(45) Date of Patent: Nov. 13, 2007

(54) DETACHABLE FLYWHEEL DEVICE

(75) Inventor: Shih Hua Tseng, Taipei (TW)

(73) Assignee: Tatung Co., Ltd., Jhongshan District, Taipei (TW)

( * ) Notice: Subject to any disclaimer, the term of this patent is extended or adjusted under 35 U.S.C. 154(b) by 599 days.

(21) Appl. No.: 10/778,150

(22) Filed: Feb. 17, 2004

(65) Prior Publication Data

US 2005/0062731 A1 Mar. 24, 2005

(30) Foreign Application Priority Data

Sep. 19, 2003 (TW) .............................. 92125952 A

(51) Int. Cl.
*G09G 5/00* (2006.01)
(52) U.S. Cl. ....................... 345/156; 345/169; 345/184
(58) Field of Classification Search ........ 345/156–172, 345/905, 184
See application file for complete search history.

(56) References Cited

U.S. PATENT DOCUMENTS

| | | | | |
|---|---|---|---|---|
| 5,572,237 A | * | 11/1996 | Crooks et al. | 345/156 |
| 5,912,661 A | * | 6/1999 | Siddiqui | 345/166 |
| 5,912,667 A | * | 6/1999 | Chang | 715/808 |
| 5,977,953 A | * | 11/1999 | Tseng | 345/164 |
| 6,144,368 A | * | 11/2000 | Ooka et al. | 345/161 |
| 6,297,795 B1 | * | 10/2001 | Kato et al. | 345/169 |
| 6,344,643 B1 | * | 2/2002 | Chen | 345/165 |
| 6,710,771 B1 | * | 3/2004 | Yamaguchi et al. | 345/172 |
| 6,987,505 B1 | * | 1/2006 | Koo | 345/163 |
| 2002/0054023 A1 | * | 5/2002 | Adan et al. | 345/163 |

FOREIGN PATENT DOCUMENTS

JP 2006170788 A * 6/2006

* cited by examiner

*Primary Examiner*—David L. Lewis
(74) *Attorney, Agent, or Firm*—Bacon & Thomas, PLLC

(57) ABSTRACT

A detachable flywheel device is placed on a display and is used for adjusting display parameters of the display. Since a user only needs to roll or press the detachable flywheel to adjust the display parameters of the display, which is a very simple and fast action, the user can continue to watch the display. Furthermore, by using an optical technique to detect the detachable flywheel's movement, there is no mechanical wear or problems related to dust. Furthermore, the user can place the detachable flywheel device to a predetermined position, or remove the detachable flywheel device in order to prevent other people from changing the display parameters.

5 Claims, 5 Drawing Sheets

DETACHABLE FLYWHEEL DEVICE

BACKGROUND OF THE INVENTION

1. Field of the Invention

The present invention relates to a flywheel device and, more particularly, to a detachable flywheel device for adjusting display settings of a display.

2. Description of the Related Art

User requirements are the driving force of new technology. In order to reduce radiation from displays, the liquid crystal display (LCD), which does not radiate, was developed; in order to provide flat screens, the flat panel display was developed.

However, existing displays may all have display errors, such as an offset in the displayed picture, or incorrect color saturation. In order to provide a displayed picture that satisfies the user, the display has a display adjuster and an on-screen display (OSD), as shown in FIG. 1A. The display adjuster is used for adjusting the settings provided by the OSD to change the displaying settings of the display, such as the display brightness value shown in FIG. 1B, or a display working clock frequency value shown in FIG. 1C, so that the displayed picture will satisfy the user's requirements. As shown in FIG. 2 or FIG. 3, a display 10 may use one of two different displaying adjusters; one is touch-pad adjuster 20, and the other is a flywheel adjuster 30. The touch-pad adjuster 20 typically has three buttons, which respectively correspond to a menu button (including a confirming function) 24, an increase button 26 (including a menu roll forward function) and a decrease button 22 (including a menu roll backward function). These three buttons are used for selecting a proper function menu and inputting adjustment values to change the displayed picture. The flywheel adjuster 30 has similar capabilities as the touch-pad adjuster 20; the only difference is that the flywheel adjuster 30 uses a flywheel to roll forward or backward to substitute for the increase button 26 and the decrease button 22, and further has a menu button 32, which is similar to the menu button 24. The flywheel adjuster 30 can have many different structures, such as U.S. Pat. No. 5,912,663 entitled "Monitor adjustments made by a single rotatable and depressible knob which interfaces with a monitor control display menu".

When using the touch-pad adjuster 20 or the flywheel adjuster 30 to adjust the display settings for the display 10, a user needs to go back and forth between the display 10 and the adjuster to check the changes on the display, which is very inconvenient and exhausting for the user.

Therefore, it is desirable to provide a detachable flywheel device for adjusting displaying settings of a display to mitigate and/or obviate the aforementioned problems.

SUMMARY OF THE INVENTION

A main objective of the present invention is to provide a detachable flywheel device for adjusting displaying settings of a display, which is used as a display settings adjuster.

Another objective of the present invention is to provide a detachable flywheel device for adjusting displaying settings of a display, which can be placed on or detached from the display.

In order to achieve the above-mentioned objective, the detachable flywheel device for adjusting display settings of a display includes a flywheel having a plurality of gaps with different spaces, used to be rolled or pushed; a shaft passing through a center point of the flywheel; a supporting shelf for supporting the shaft and limiting a horizontal and a vertical movement range of the shaft; a spring for supporting the shaft; a switch placed along the spring for outputting a switch signal when touched by the shaft; a light source for providing light; a light sensor for detecting the light from the light source and outputting a detecting signal; a microprocessor for adjusting the display settings of the display according to the switch signal and the detecting signal; wherein the detachable flywheel device is placed at a predetermined position on the display.

Since the user only needs to roll or press the flywheel to adjust the displaying settings of the display, which is very simple and fast, the user can continue to watch the display. Furthermore, by using an optical technique to detect the flywheel's movement, there is no mechanical structure wear and problems with dust. In addition, the position of the detachable flywheel device on the display can be determined by the user.

Other objects, advantages, and novel features of the invention will become more apparent from the following detailed description when taken in conjunction with the accompanying drawings.

DETAILED DESCRIPTION OF THE PREFERRED EMBODIMENT

Figure 1A:
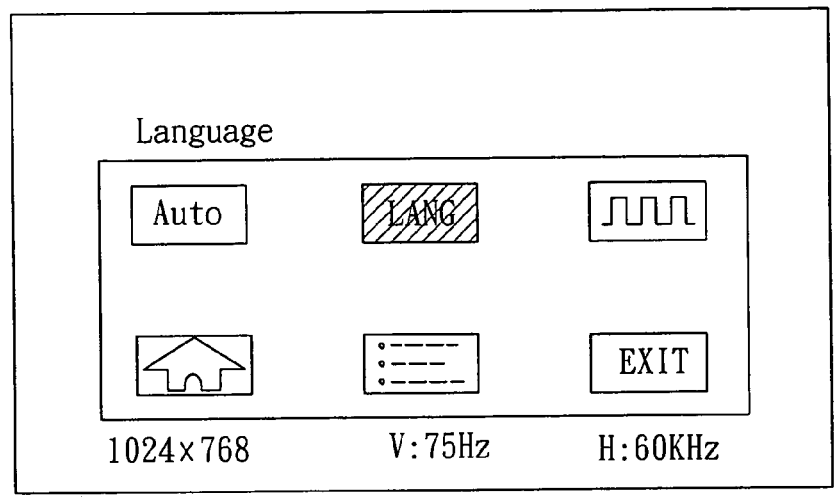
FIG. 1A is a schematic drawing of a adjuster interface.
Figure 1B:
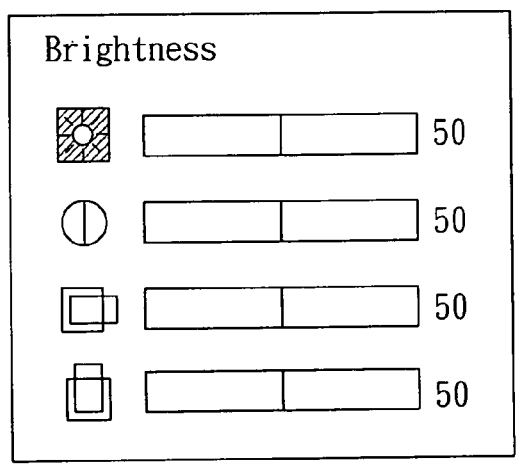
FIG. 1B shows some displaying settings of the display.
Figure 1C:
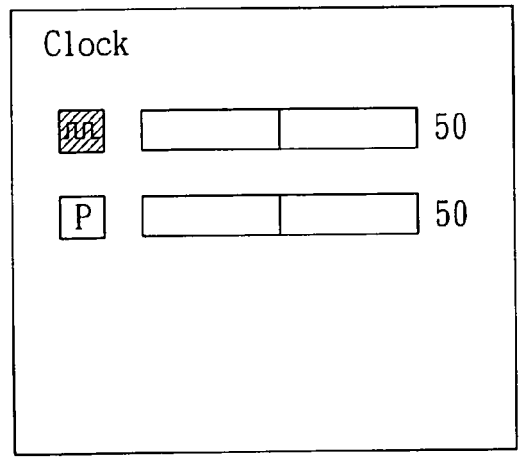
FIG. 1C shows some other displaying settings of the display.
Figure 2:
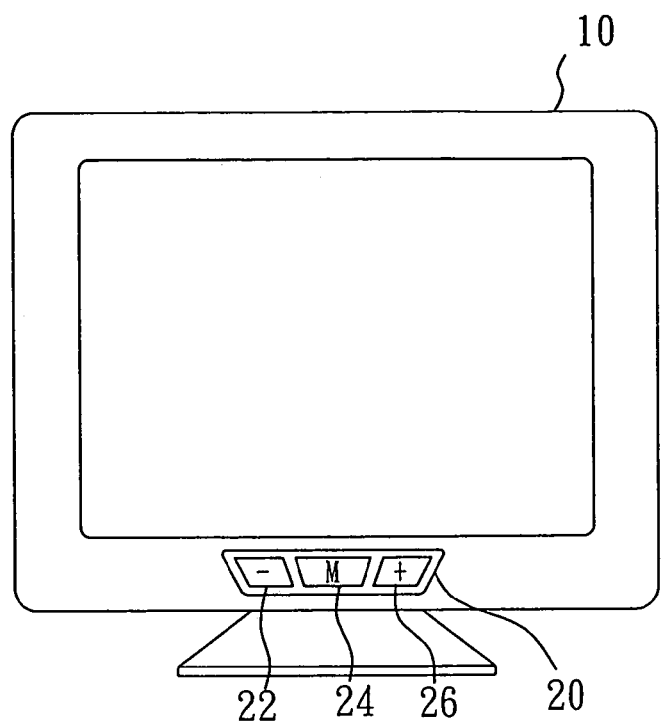
FIG. 2 is a schematic drawing of a prior art touch-pad adjuster.
Figure 3:
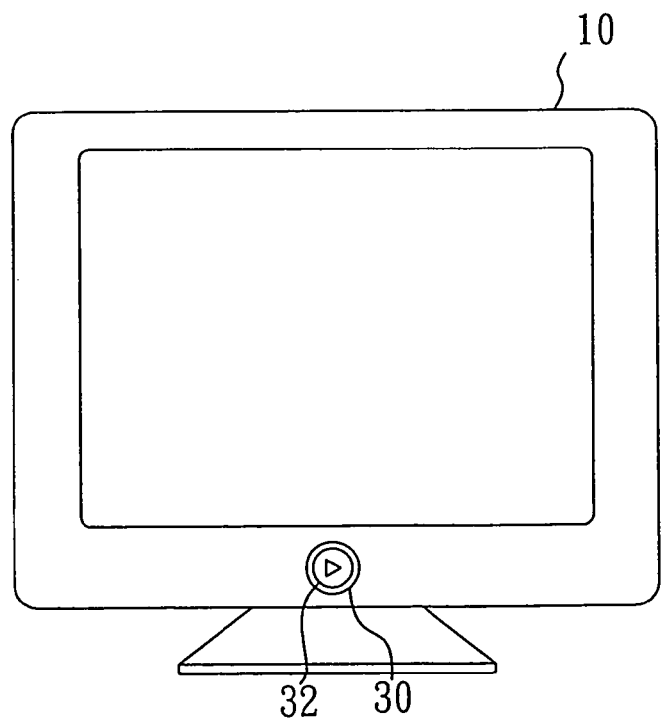
FIG. 3 is a schematic drawing of a prior art flywheel adjuster.
Figure 4:
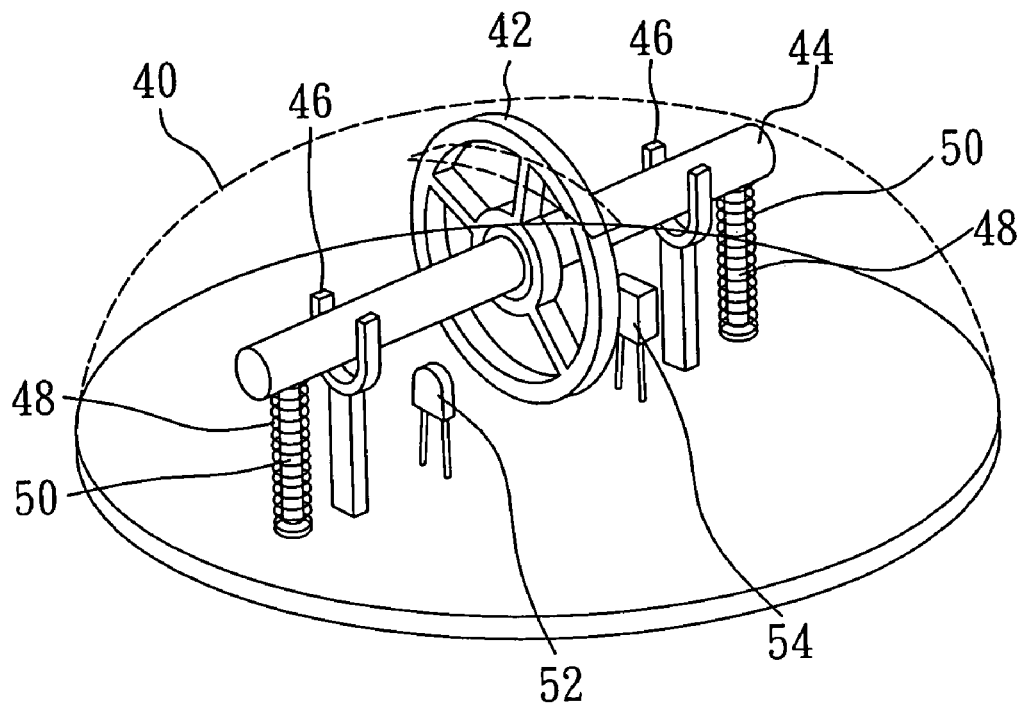
FIG. 4 is a schematic drawing of a detachable flywheel device of the present invention.

Please refer to FIG. 4. FIG. 4 is a schematic drawing of a detachable flywheel device 40 of the present invention. As shown in FIG. 4, a detachable flywheel device 40 comprises the following elements: A flywheel 42, which provides a surface for the user to roll thereon (the user would roll the surface of the flywheel 42 horizontally). The flywheel 42 has a lot of gaps with different spaces respectively for the detachable flywheel device 40 to roll forward or backward, which replaces the prior art flywheel, increase button 26 and decrease button 22. Furthermore, the user can press the detachable flywheel device 40 for use as a menu button (the user would press the surface of the flywheel vertically), to replace the menu button 24 or 32.

A shaft 44 passes through a center point of the flywheel 42 and is supported by a supporting shelf 46 and a spring 48.

The supporting shelf 46 is used for supporting the shaft 44 and the flywheel 42, and limits a horizontal movement range of the shaft 44. Therefore, the flywheel 42 will not damage the detachable flywheel device 40 because of vertical movement performed by the user. A spring 48 is used for supporting the shaft 44 and the flywheel 42. A switch 50 is placed in the spring 48. When the user press the flywheel 42, the shaft 44 moves down vertically to touch the switch 50, and the switch 50 outputs a switching signal to a microprocessor 56 (shown in FIG. 4) to serve as the prior art menu button 24 or 32. Since the supporting shelf 46 limits the vertical movement of the shaft 44, when the user touches the switch 50, the flywheel 42 reaches its maximum vertical movement distance.

Figure 7:
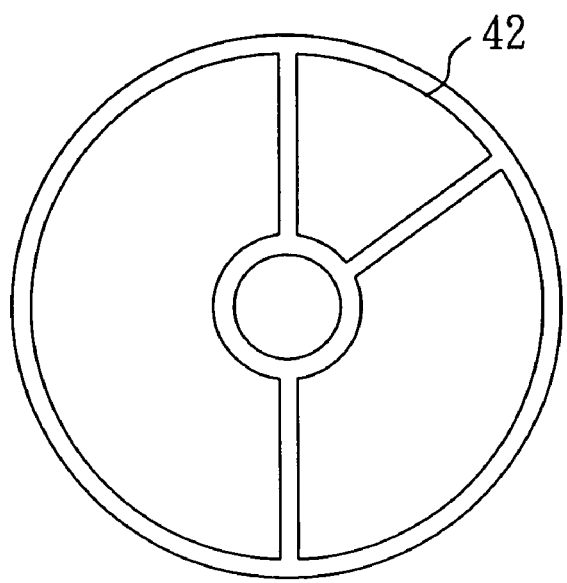
FIG. 7 is a schematic drawing of a flywheel.
Figure 8:
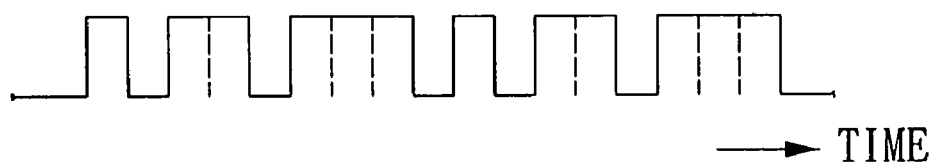
FIG. 8 is an graph showing detecting signal changes from long to short.
Figure 9:
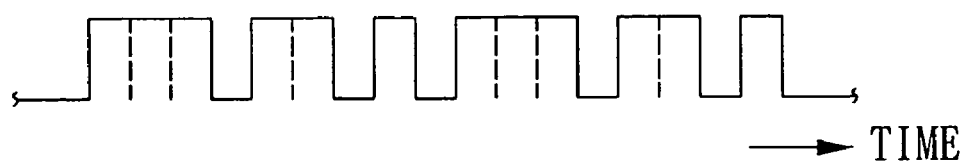
FIG. 9 is an graph showing detecting signal changes from short to long.

An LED (Light Emitting Diode) 52 is used for providing a light source. A light detector 54 is used for detecting the light provided by the LED 52. When the flywheel 42 is rotated, the gap of the flywheel 42 is bigger, a longer detecting signal (a continuous signal) is output to a microprocessor. The flywheel 42 has a lot of gaps with different spaces, such as the gap changes from large to small gradually. When the user rolls the flywheel 42 forward, the detecting signal output from the light detector 54 changes from short to long as shown in FIG. 7; when the user rolls the flywheel 42 backward, the detecting signal output from the light detector 54 changes from long to short as shown in FIG. 8. Therefore, the microprocessor 56 determines the user is rolling the flywheel 42 forward or backward, which provides the same functionality as the prior art flywheel, the increase button 26 or the decrease button 22. However, the microprocessor 56 can change its rolling direction determination according to a different setting.

Figure 5:
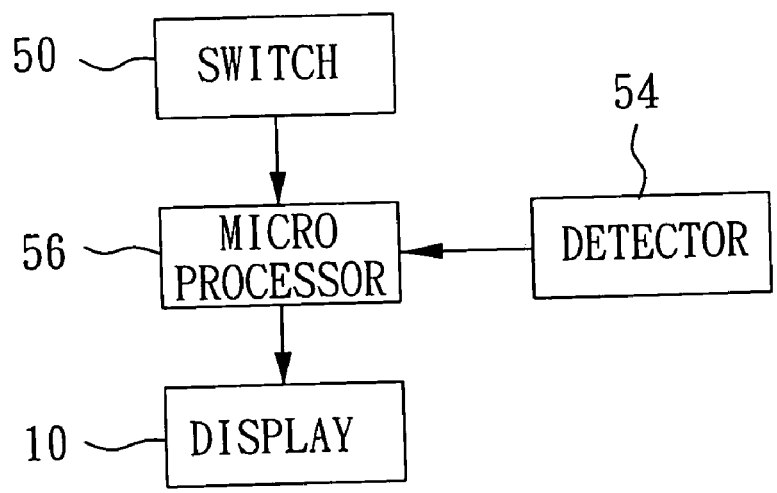
FIG. 5 is a block diagram of the detachable flywheel device of the present invention.

As shown in FIG. 5, the detachable flywheel device 40 of the present invention can be divided into the following blocks according to their electronic functions:

The switch 50: when it is activated, it sends the switch signal to the microprocessor 56.

The light detector 54: when it receives light from the LED 52, it outputs the detecting signal to the microprocessor 56.

The microprocessor 56: it adjusts the display parameters of the display 10 according to the switch signal and the detecting signal. When it receives the switch signal, it determines the user wants to select a menu or to confirm a setting. When the detecting signal changes from long to short, it determines the user wants to execute the functionality of the prior art increase button 26; when the detecting signal changes from short to long, it determines the user wants to execute the functionality of the prior art decrease button 22. The microprocessor 56 outputs the changed display setting to the display 10 to adjust the display parameters.

Figure 6:
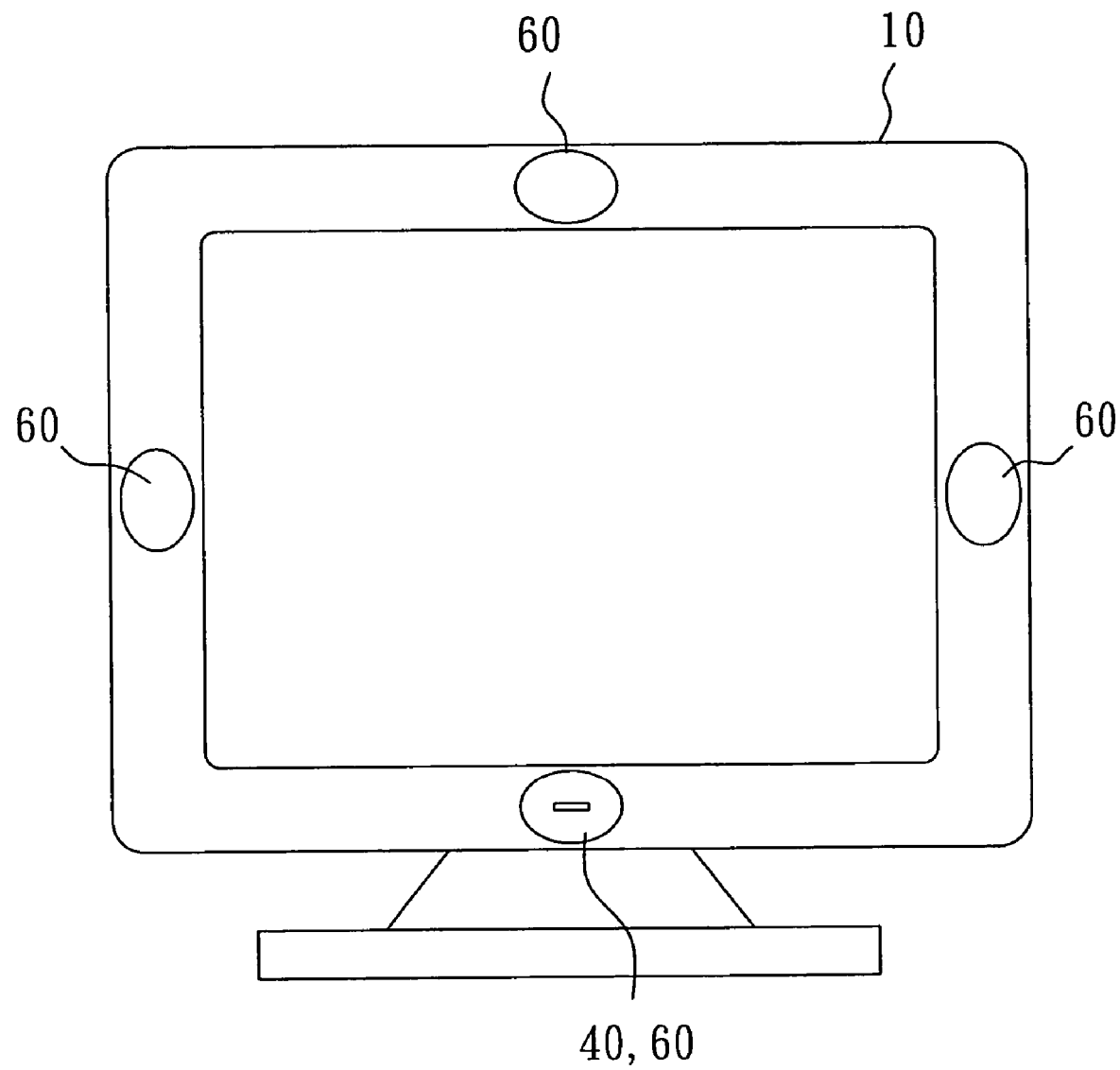
FIG. 6 is a schematic drawing of a display with a detachable flywheel device of the present invention.

As shown in FIG. 6, the detachable flywheel device 40 of the present invention can also be placed at other positions on the display 10, such as a position 60, to satisfy the desires of different users. Since the detachable flywheel device 40 only outputs two control signals (co-operating with a power line), which require only two control signal lines, and utilizes the microprocessor 56 in the display 10, assembly-related difficulties should be very low.

The user only needs to roll or press the flywheel to adjust the display parameters of the display, and the user can continue to watch the display. Moreover, as the detachable flywheel device 40 uses an optical technique to detect the movement direction of the flywheel 42, there is little or no problem with mechanical wear or dust.

Although the present invention has been explained in relation to its preferred embodiment, it is to be understood that many other possible modifications and variations can be made without departing from the spirit and scope of the invention as hereinafter claimed.

What is claimed is:

1. A detachable flywheel device for adjusting display settings of a display, comprsing:
    a flywheel, having a plurality of gaps with different spaces, used to be rolled or pushed;
    a shaft, passing through a center point of the flywheel;
    a supporting shelf for supporting the shaft and limiting a horizontal and a vertical movement range of the shaft;
    a spring for supporting the shaft;
    a switch, placed along the spring for outputting a switch signal when touched by the shaft;
    a light source for providing light;
    a light sensor for detecting the light from the light source and outputting a detecting signal; and
    a microprocessor for adjusting the display settings of the display according to the switch signal and the detecting signal;
    wherein the detachable flywheel device is detachably placed at a predetermined position on the display.

2. The detachable flywheel device as claimed in claim 1, wherein the gaps increase from small space to large space gradually.

3. The detachable flywheel device as claimed in claim 2, wherein when the flywheel is rolled, if the detecting signal changes from longer to shorter due to the gaps changing, the microprocessor determines the flywheel is rolled forward; if the detecting signal changes from shorter to longer due to the gaps changing, the microprocessor determines the flywheel is rolled backward.

4. The detachable flywheel device as claimed in claim 1, wherein when a display setting is changed, the display adjusts display parameters according to the changed display setting.

5. The detachable flywheel device as claimed in claim 1, wherein the predetermined position is on a side of the display.

* * * * *